(12) United States Patent
Tomo

(10) Patent No.: US 7,677,341 B2
(45) Date of Patent: Mar. 16, 2010

(54) HYBRID VEHICLE AND CONTROL METHOD OF HYBRID VEHICLE

(75) Inventor: Kentaro Tomo, Chiryu (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 427 days.

(21) Appl. No.: 11/883,326

(22) PCT Filed: May 31, 2006

(86) PCT No.: PCT/JP2006/011355

§ 371 (c)(1),
(2), (4) Date: Jul. 30, 2007

(87) PCT Pub. No.: WO2006/129853

PCT Pub. Date: Dec. 7, 2006

(65) Prior Publication Data

US 2008/0099259 A1 May 1, 2008

(30) Foreign Application Priority Data

Jun. 1, 2005 (JP) .............................. 2005-161613

(51) Int. Cl.
*B60W 10/04* (2006.01)
(52) U.S. Cl. ...................... 180/65.265; 903/930; 701/22
(58) Field of Classification Search .............. 180/65.21, 180/65.265, 65.28, 65.285; 903/930; 701/22
See application file for complete search history.

(56) References Cited

U.S. PATENT DOCUMENTS

| | | | | |
|---|---|---|---|---|
| 5,789,877 A | * | 8/1998 | Yamada et al. ................. | 318/9 |
| 5,818,116 A | * | 10/1998 | Nakae et al. ............... | 290/38 R |
| 6,131,538 A | * | 10/2000 | Kanai ............................. | 123/2 |
| 6,380,640 B1 | * | 4/2002 | Kanamori et al. ......... | 290/40 C |
| 6,742,487 B2 | * | 6/2004 | Yamaguchi et al. ...... | 123/179.3 |
| 6,816,759 B2 | * | 11/2004 | Kimura ........................ | 701/22 |
| 6,931,318 B2 | * | 8/2005 | Kaita et al. .................. | 701/113 |
| 2001/0022166 A1 | | 9/2001 | Yamaguchi et al. | |
| 2004/0006419 A1 | | 1/2004 | Kimura | |
| 2004/0231627 A1 | | 11/2004 | Kaita et al. | |

FOREIGN PATENT DOCUMENTS

| | | |
|---|---|---|
| JP | A 10-325345 | 12/1998 |
| JP | A 2000-026190 | 1/2000 |
| JP | A 2001-059437 | 3/2001 |

* cited by examiner

*Primary Examiner*—Lesley Morris
*Assistant Examiner*—John D Walters
(74) *Attorney, Agent, or Firm*—Oliff & Berridge PLC

(57) ABSTRACT

When the driver heavily depresses an accelerator pedal to start a hybrid vehicle in an engine stop condition, the control of the invention waits until elapse of a preset wait time and then starts outputting a torque equivalent to a preset torque demand to a ring gear shaft or a driveshaft. The preset wait time is determined not to make the driver feel uncomfortable with a poor response. This arrangement desirably shortens a time period when the vehicle acceleration is restricted due to insufficient power output until the engine starts to output sufficient power and make significant contribution to the vehicle acceleration. The control of the invention thus desirably prevents the driver from feeling the unexpectedly slow acceleration.

12 Claims, 12 Drawing Sheets

HYBRID VEHICLE AND CONTROL METHOD OF HYBRID VEHICLE

TECHNICAL FIELD

The present invention relates to a hybrid vehicle and its control method. More specifically the invention pertains to a hybrid vehicle equipped with an internal combustion engine capable of outputting driving power and at least one motor capable of outputting driving power, as well as a control method of such a hybrid vehicle.

BACKGROUND ART

One proposed hybrid vehicle has an engine and a generator motor connected to an output shaft linked to an axle via a planetary gear, and a driving motor connected to the axle (see, for example, Japanese Patent Laid-Open Gazette No. H10-325345). In this prior art structure, the driving motor is used to start the hybrid vehicle under an engine stop condition and, when the vehicle speed reaches 10 km/h, the engine starts to output the power for driving.

DISCLOSURE OF THE INVENTION

When the driver requires sudden acceleration for a jackrabbit start, the prior art hybrid vehicle may undesirably make the driver feel the unexpectedly slow acceleration immediately after a start and worsen the driver's drive feeling. The motor generally outputs a large torque at a low rotation speed but decreases its maximum torque output with an increase in rotation speed. In response to the driver's requirement for sudden acceleration, the driving motor outputs a large torque to make a jackrabbit start of the hybrid vehicle. The driving motor, however, decreases its maximum torque output with an increase in vehicle speed. The sum of the output torque from the driving motor and the output torque from the engine is thus required to satisfy a torque demand for driving the hybrid vehicle. A start of the engine, however, takes some time, so that a start of torque output from the engine may be behind a decrease in torque output from the driving motor. In such cases, the driver feels the unexpectedly slow acceleration. The driver may similarly feel the unexpectedly slow acceleration at the time of restarting the engine and accelerating the hybrid vehicle driven in the motor drive mode.

In a hybrid vehicle equipped with an internal combustion engine that is capable of outputting driving power and with at least one motor that is capable of outputting driving power and in a control method of the hybrid vehicle, the object of the invention is thus to ensure smooth output of a driving force for vehicle start or acceleration under an operation stop condition of the internal combustion engine. In a hybrid vehicle equipped with an internal combustion engine that is capable of outputting driving power and with at least one motor that is capable of outputting driving power and in a control method of the hybrid vehicle, the object of the invention is to prevent the driver from feeling unexpectedly slow acceleration at a time of vehicle start or acceleration under an operation stop condition of the internal combustion engine.

In order to attain at least part of the above and the other related objects, the hybrid vehicle of the invention and the control method of the hybrid vehicle have the configurations discussed below.

The present invention is directed to a hybrid vehicle equipped with an internal combustion engine capable of outputting driving power and with at least one motor capable of outputting driving power. The hybrid vehicle includes: an auto stop restart module that automatically stops the internal combustion engine upon satisfaction of a preset engine stop condition and automatically restarts the internal combustion engine upon satisfaction of a preset engine start condition; a driving force demand setting module that sets a driving force demand required for driving the hybrid vehicle; and a control module that controls the internal combustion engine and the motor so as to ensure output of a driving force based on the driving power demand set by the driving force demand setting module while imposing restriction on operation of the motor in response to setting of a driving force demand for vehicle start or acceleration by the driving force demand setting module upon satisfaction of the preset engine start condition during an auto stop of the internal combustion engine, the control module removing the restriction on the operation of the motor upon satisfaction of a predetermined restriction cancellation condition.

In response to setting of a driving force demand for vehicle start or acceleration upon satisfaction of the preset engine start condition during an auto stop of the internal combustion engine, the hybrid vehicle of the invention controls the internal combustion engine and the motor to impose restriction on operation of the motor until satisfaction of the predetermined restriction cancellation condition while ensuring output of a driving force equivalent to the driving power demand. The restriction on the operation of the motor results in a smooth variation in total driving force from a motor-only output mode to an engine-motor output mode with a start of the internal combustion engine. This arrangement effectively ensures smooth output of the driving force and desirably prevents the driver from feeling the unexpectedly slow acceleration. The terminology 'in response to setting of a driving force demand for vehicle start or acceleration upon satisfaction of the preset engine start condition during an auto stop of the internal combustion engine' includes 'at a time of starting the hybrid vehicle with a restart of the internal combustion engine in a vehicle stop state under the auto stop condition of the internal combustion engine' and 'at a time of accelerating the hybrid vehicle with a restart of the internal combustion engine in a drive mode with output power from the motor under the auto stop condition of the internal combustion engine'.

In one preferable application of the hybrid vehicle of the invention, the restriction imposed on the operation of the motor may prohibit power output from the motor or may hold a level of power output from the motor. In this application, a certain wait time elapses before output of a required power from the internal combustion engine. This arrangement more effectively ensures smooth output of the driving force after satisfaction of the predetermined restriction cancellation condition and prevents the driver from feeling the unexpectedly slow acceleration.

In another preferable application of the hybrid vehicle of the invention, the predetermined restriction cancellation condition may be elapse of a preset wait time since setting of the driving force demand for vehicle start or acceleration. The preset wait time may be a time period that does not make a general driver feel uncomfortable with a response to vary an acceleration after the driver's accelerator operation. This arrangement effectively prevents the driver from feeling uncomfortable at the time of vehicle start or at the time of vehicle acceleration due to the restricted operation of the motor.

In still another preferable application of the hybrid vehicle of the invention, the preset engine start condition may include a condition that the driving force demand set by the driving force demand setting module is not less than a predetermined level. This arrangement enables a quicker start of the internal combustion engine, compared with an auto start of the internal combustion engine that starts the internal combustion engine when the vehicle speed reaches a preset speed level. This arrangement more effectively ensures smooth output of the driving force at the time of vehicle start or at the time of vehicle acceleration and prevents the driver from feeling the unexpectedly slow acceleration.

In further still another preferable application, the hybrid vehicle of the invention may include an electric power-mechanical power input output mechanism connected with an output shaft of the internal combustion engine and an axle, and the mechanism may output at least part of the power of the internal combustion engine to the axle through input and output of electric power and mechanical power. In this application, the electric power-mechanical power input output mechanism may include: a three shaft-type power input output unit linked to three shafts, the output shaft of the internal combustion engine, the axle, and a rotating shaft, and the unit may automatically input and output power from and to a residual one shaft based on powers input from and output to any two shafts among the three shafts; and a generator that inputs and outputs power from and to the rotating shaft. Moreover, the electric power-mechanical power input output mechanism may include a pair-rotor motor that has a first rotor connected to the output shaft of the internal combustion engine and a second rotor connected to the axle and is driven to rotate through relative rotation of the first rotor to the second rotor. In this application, the motor may input and output power from and to an axle that receives output of power from the internal combustion engine. Further, the motor may input and output power from and to another axle different from an axle that receives output of power from the internal combustion engine. Moreover, the motor may be either one or both of a first motor inputting and outputting power from and to one axle that receives output of power from the internal combustion engine and a second motor inputting and outputting power from and to another axle different from the one axle.

The present invention is also directed to a control method of a hybrid vehicle equipped with an internal combustion engine capable of outputting driving power and at least one motor capable of outputting driving power, and automatically stopping the internal combustion engine upon satisfaction of a preset engine stop condition and automatically restarting the internal combustion engine upon satisfaction of a preset engine start condition. The control method includes the steps of: controlling the internal combustion engine and the motor so as to ensure output of a driving force based on the driving power demand set by the driving force demand setting module while imposing restriction on operation of the motor in response to setting of a driving force demand for vehicle start or acceleration by the driving force demand setting module upon satisfaction of the preset engine start condition during an auto stop of the internal combustion engine; and removing the restriction on the operation of the motor upon satisfaction of a predetermined restriction cancellation condition.

In response to a drive request upon satisfaction of the preset engine start condition during an auto stop of the internal combustion engine, the control method of the invention controls the internal combustion engine and the motor to impose restriction on operation of the motor until satisfaction of the predetermined restriction cancellation condition, while ensuring output of a driving force equivalent to a driving power demand required for driving the hybrid vehicle. The restriction on the operation of the motor results in a smooth variation in total driving force from a motor-only output mode to an engine-motor output mode with a start of the internal combustion engine. This arrangement effectively ensures smooth output of the driving force at the time of vehicle start or at the time of vehicle acceleration and desirably prevents the driver from feeling the unexpectedly slow acceleration.

BEST MODES OF CARRYING OUT THE INVENTION

Figure 1:
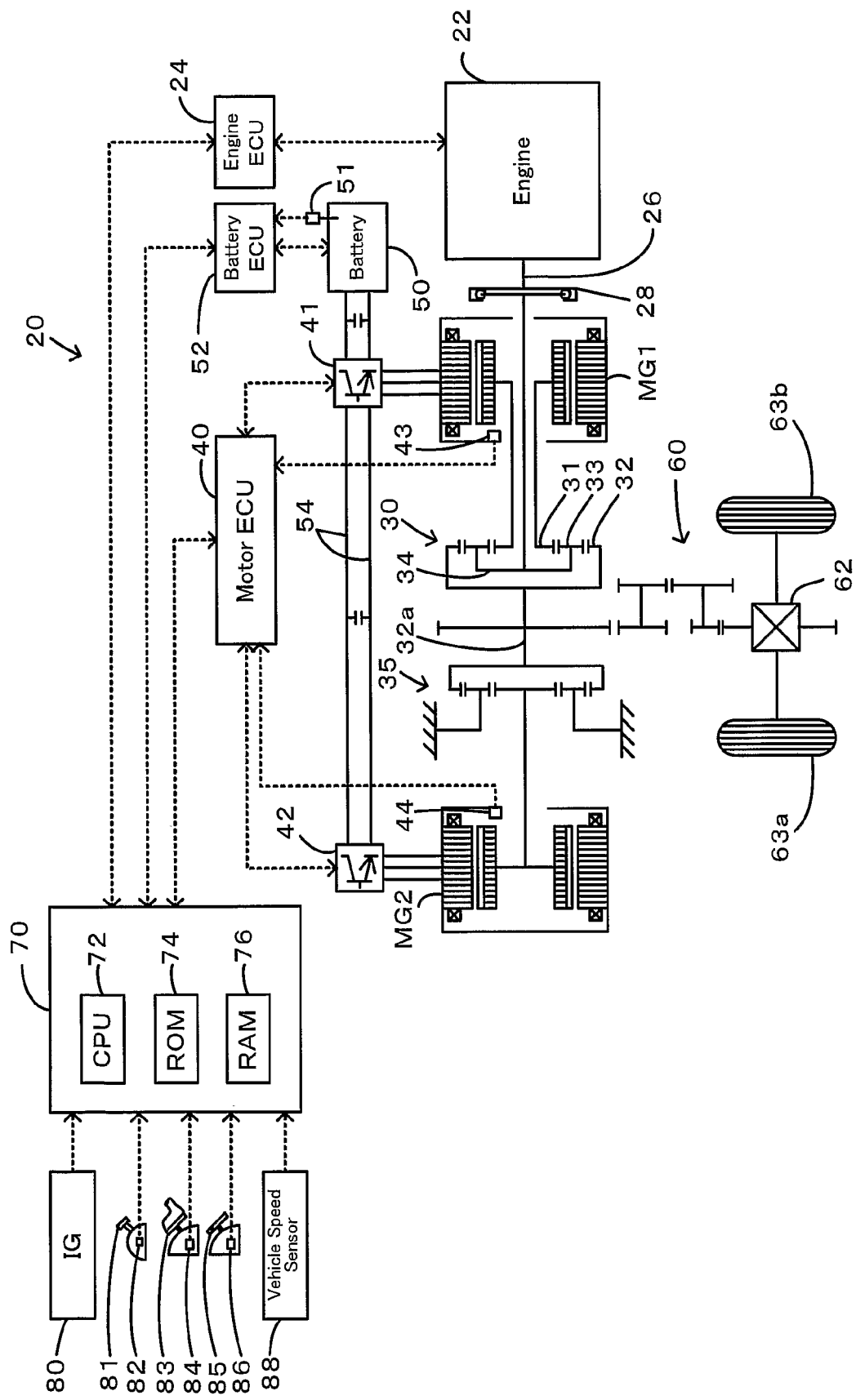
FIG. 1 schematically illustrates the configuration of a hybrid vehicle in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a. The torque conversion drive mode is equivalent to the charge-discharge drive mode without charge or discharge of the battery 50: There is accordingly no necessity to specifically discriminate the torque conversion drive mode from the charge-discharge drive mode. The hybrid vehicle 20 of the embodiment stops the operation of the engine 22 and runs in the motor drive mode under the condition of a relatively small power demand for the vehicle, for example, during a low-speed drive or during a vehicle stop. The hybrid vehicle of the embodiment drives the engine 22 and runs in the charge-discharge drive mode under the condition of a large power demand or a large torque demand for the vehicle, for example, during a high-speed drive or on the occasion of an abrupt acceleration from the low speed. The hybrid vehicle 20 of the embodiment drives the engine 22 and runs in the charge-discharge drive mode under the requirement of warming up the engine 22 or a catalyst packed in a catalyst converter for treatment of the emission from the engine 22 or under the requirement of charging the battery 50 having a low state of charge (SOC).

Figure 2:
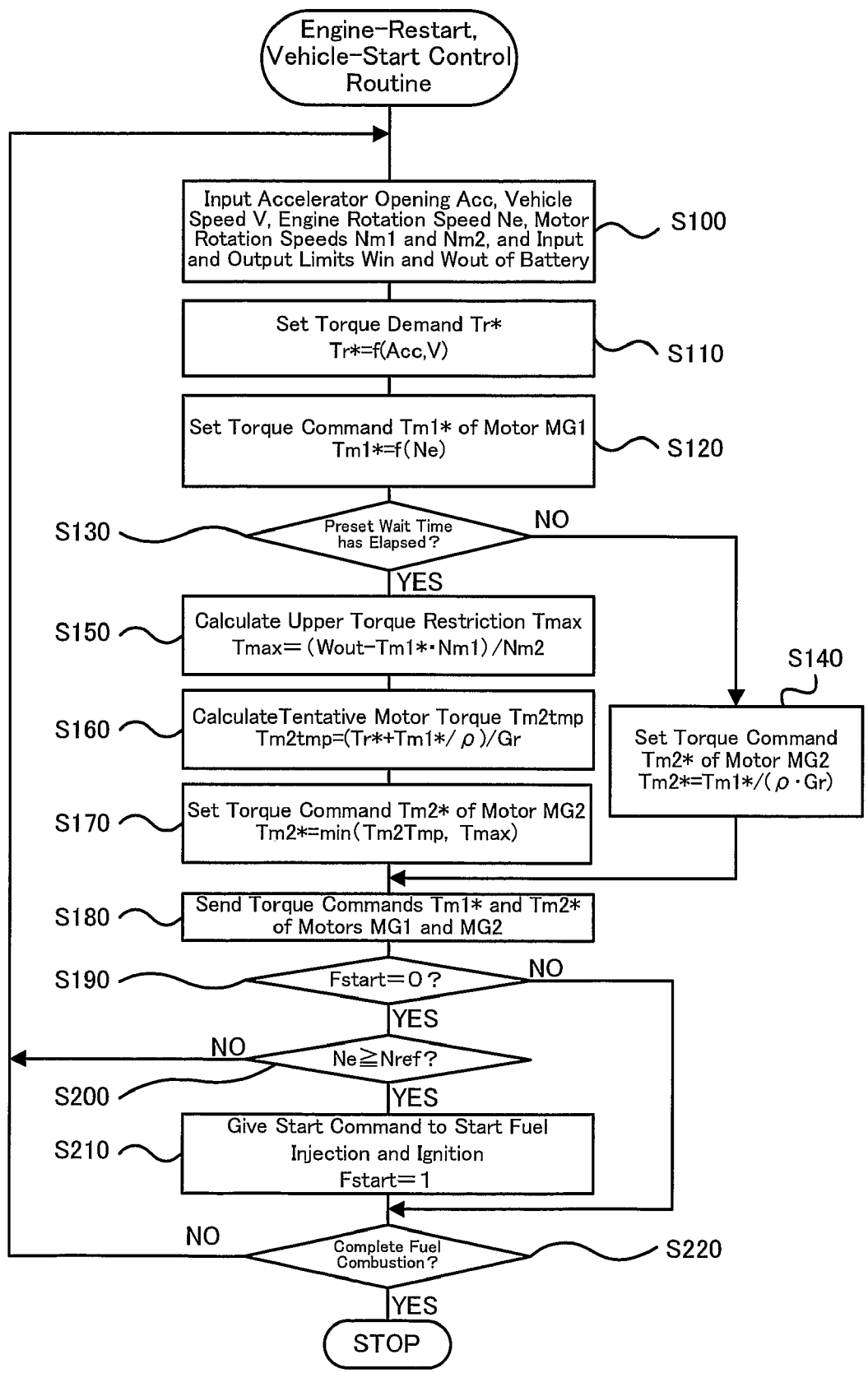
FIG. 2 is a flowchart showing an engine-restart, vehicle-start control routine executed by a hybrid electronic control unit mounted on the hybrid vehicle of the embodiment.
Figure 3:
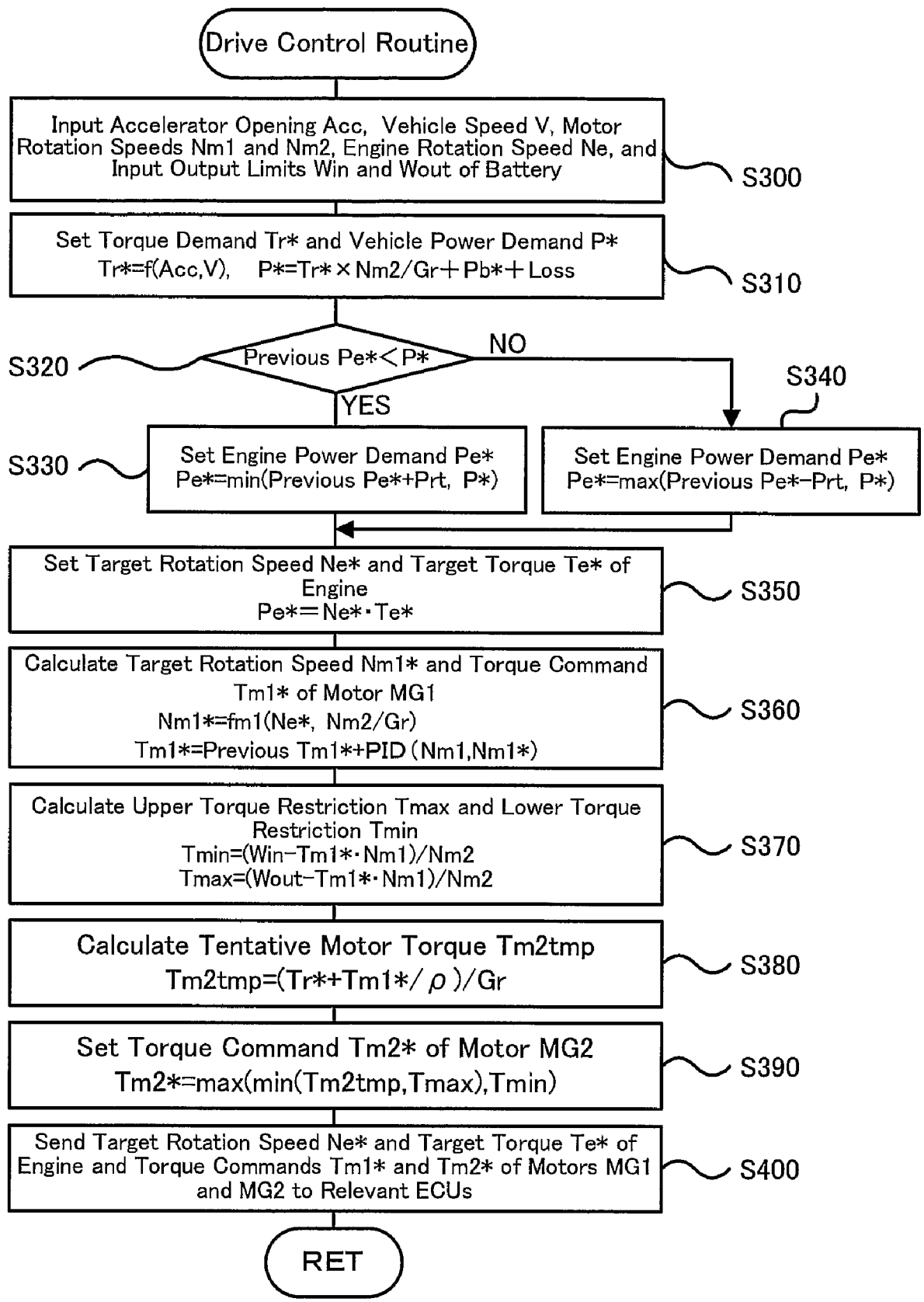
FIG. 3 is a flowchart showing a drive control routine executed by the hybrid electronic control unit.

The description regards the operations of the hybrid vehicle 20 of the embodiment constructed as described above, especially a series of control operations to restart the engine 22 and start the hybrid vehicle 20 in response to the driver's heavy depression of the accelerator pedal 83 during a vehicle stop with the operation stop of the engine 22. FIG. 2 is a flowchart showing an engine-restart, vehicle-start control routine executed by the hybrid electronic control unit 70. This engine restart control is triggered by the driver's depression of the accelerator pedal 83 and continues until complete fuel combustion in the engine 22. FIG. 3 is a flowchart showing a drive control routine executed by the hybrid electronic control unit 70. The drive control is performed during a drive of the hybrid vehicle 20 in the charge-discharge drive mode after complete fuel combustion in the engine 22. The drive control is repeated at preset time intervals, for example, at every several msec, after complete fuel combustion in the engine 22.

The engine-restart, vehicle-start control routine of FIG. 2 is triggered by the driver's heavy depression of the accelerator pedal 83 during a vehicle stop with the operation stop of the engine 22. In the engine-restart, vehicle-start control routine of FIG. 2, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, a rotation speed Ne of the engine 22, and an input limit Win and an output limit Wout of the battery 50 (step S100). The rotation speed Ne of the engine 22 is computed from a detection signal of a crank position sensor (not shown) attached to the crankshaft 26 of the engine 22 and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The input limit Win and the output limit Wout of the battery 50 are set based on the battery temperature Tb of the battery 50 measured by the temperature sensor 51 and the state of charge SOC of the battery 50 and are received from the battery ECU 52 by communication.

Figure 4:
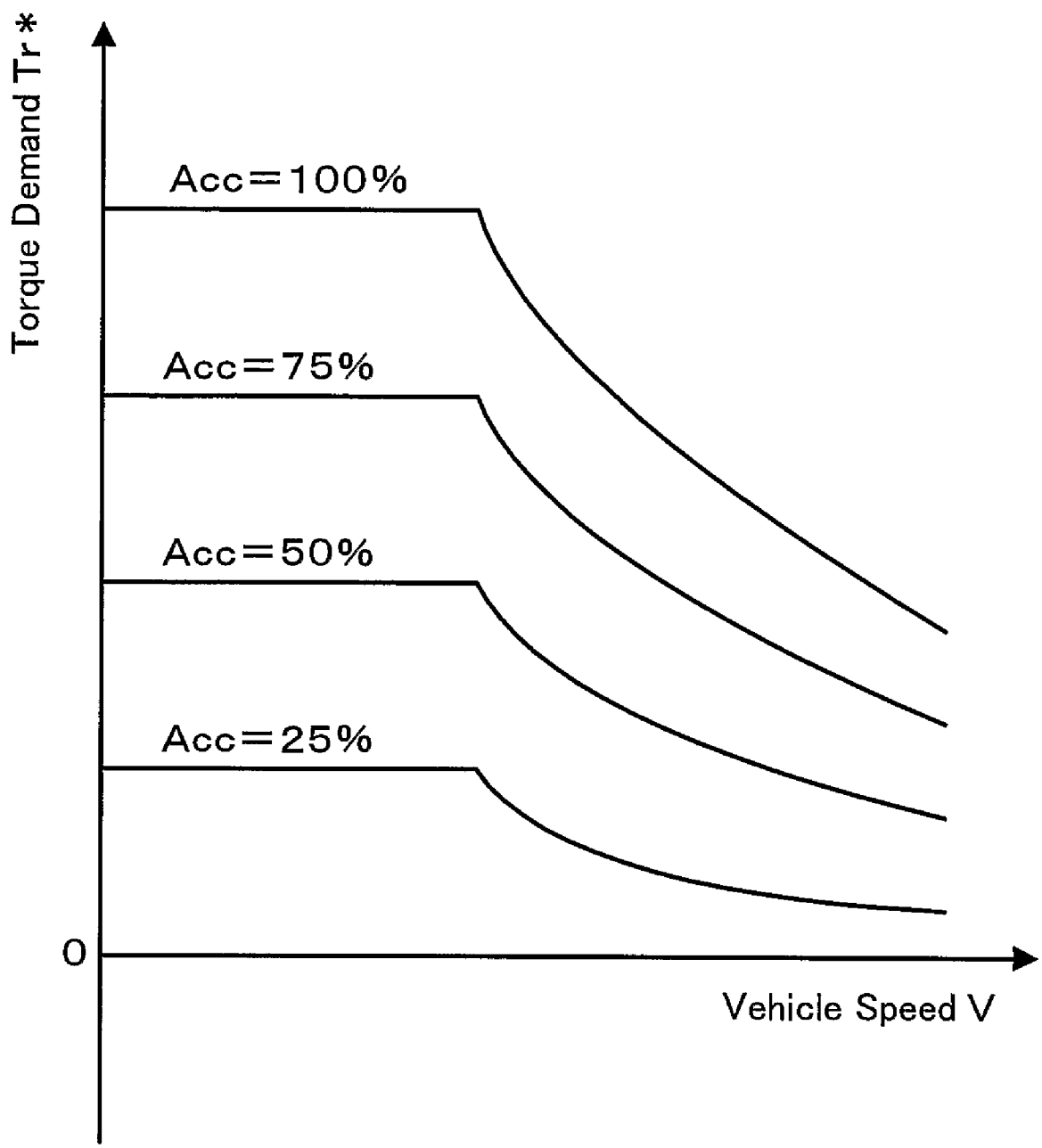
FIG. 4 shows one example of a torque demand setting map.

After the data input, the CPU 72 sets a torque demand Tr* to be output to the ring gear shaft 32a or a driveshaft linked with the drive wheels 63a and 63b as a required torque for the hybrid vehicle 20, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 4.

Figure 5:
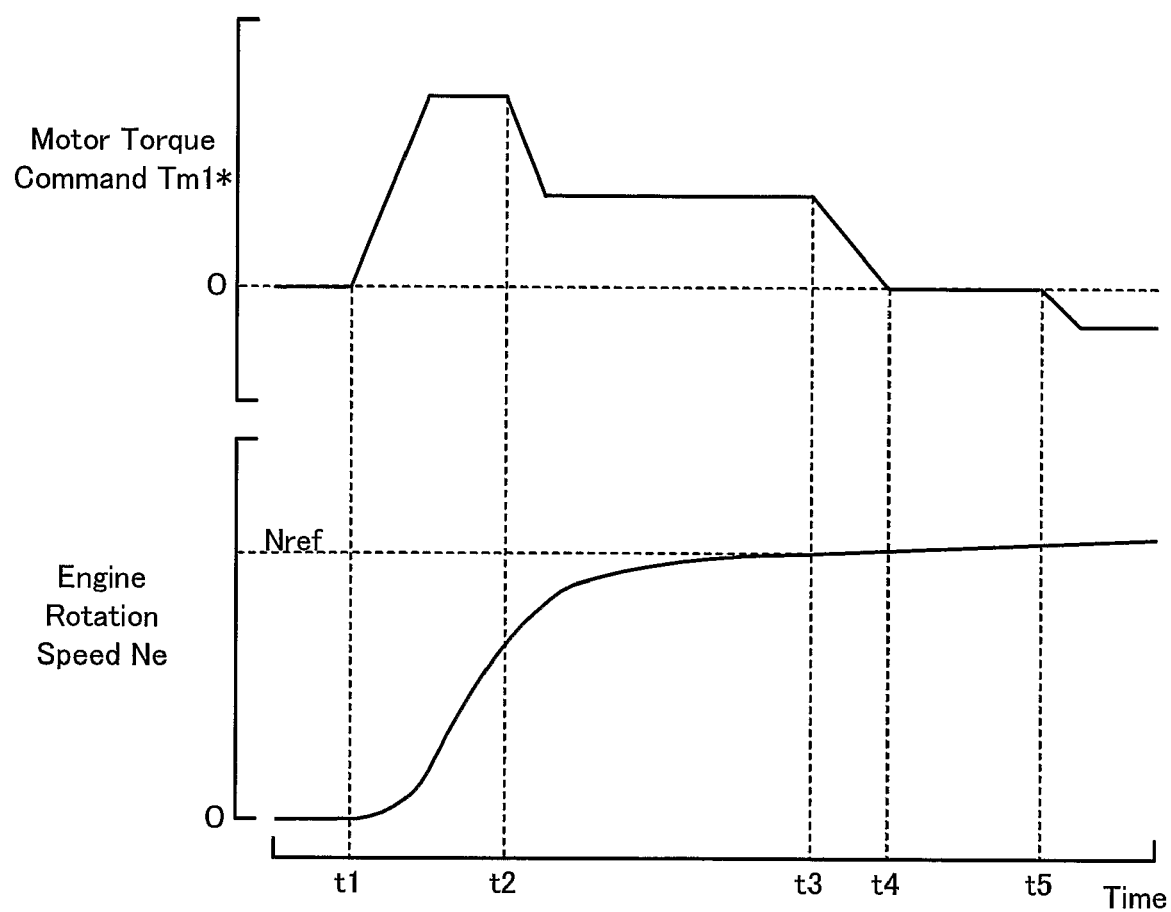
FIG. 5 shows a relation between torque command Tm1* of a motor MG1 and rotation speed Ne of an engine at a start of the engine.
Figure 6:
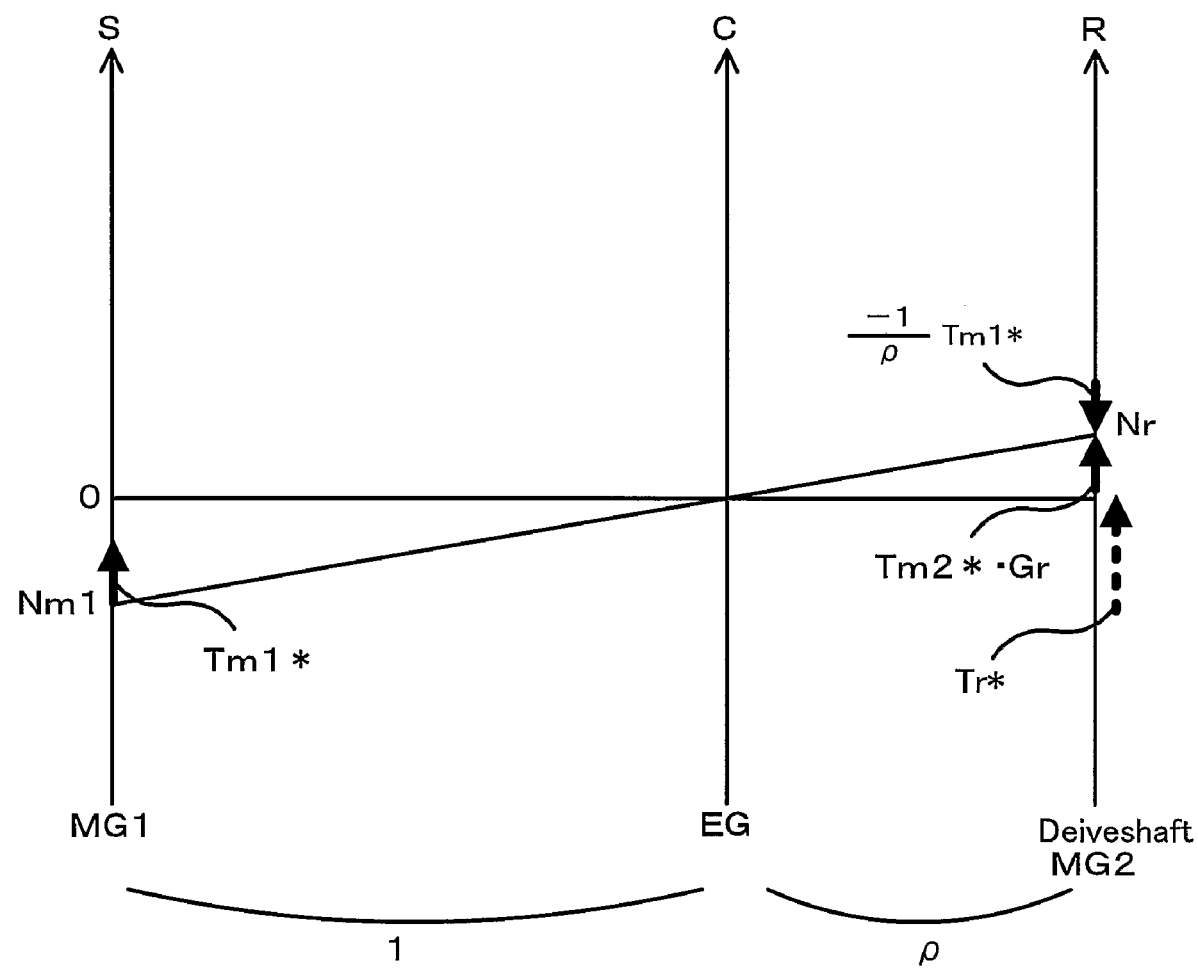
FIG. 6 is an alignment chart showing torque-rotation speed dynamics of respective rotational elements of a power distribution integration mechanism at a start of the engine.

The CPU 72 subsequently sets a torque command Tm1* of the motor MG1 according to the input rotation speed Ne of the engine 22 (step S120). FIG. 5 shows a relation between the torque command Tm1* of the motor MG1 and the rotation speed Ne of the engine 22 as one example. Immediately after a start of the engine-restart, vehicle-start control routine at a time t1, the rating process sets a relatively large torque to the torque command Tm1* of the motor MG1 and quickly increases the rotation speed Ne of the engine 22. After a time t2 when the rotation speed Ne of the engine 22 has passed through a resonant rotation speed area, the torque command Tm1* is set to a motoring torque required for stable motoring of the engine 22 to or over a threshold rotation speed Nref. Such setting reduces electric power consumption and a reactive force applied on the ring gear shaft 32a or the driveshaft. At a time t3 when the rotation speed Ne of the engine 22 reaches the threshold rotation speed Nref, the rating process sets the torque command Tm1* equal to 0. At a time t5, the complete fuel combustion in the engine 22 is identified, and the torque command Tm1* is set to a power generation torque required for power generation. The current state in the processing flow is immediately after the start instruction of the engine 22, so that a relatively large torque is set to the torque command Tm1*. FIG. 6 is an alignment chart showing torque-rotation speed dynamics of the respective rotational elements included in the power distribution integration mechanism 30 at this moment. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 that is equivalent to the product of the rotation speed Nm2 of the motor MG2 and a gear ratio Gr of the reduction gear 35.

After setting the torque command Tm1* of the motor MG1, the CPU 72 specifies whether a preset wait time has elapsed since the start of this control routine (step S130). Until elapse of the preset wait time, the CPU 72 calculates a cancellation torque, which cancels out a torque applied to the ring gear shaft 32a or the driveshaft by the torque output of the motor MG1, according to Equation (1) given below and set the calculated cancellation torque to a torque command Tm2* of the motor MG2 (step S140):

$$Tm2^* = Tm1^*/(\rho \cdot Gr) \tag{1}$$

The wait time represents a time period elapsing between the driver's depression of the accelerator pedal 83 and an actual start of the hybrid vehicle 20 with torque application and is determined not to make the driver feel uncomfortable with a poor response. The wait time is set equal to, for example, 0.2 to 0.3 seconds. The CPU 72 then sends the torque commands Tm1* and Tm2* of the motors MG1 and MG2 to the motor ECU 40 (step S180) and identifies the value of a start flag Fstart (step S190). The start flag Fstart is set to 1 on a start of fuel injection and ignition of the engine 22. Upon identification of the start flag Fstart equal to 0, the rotation speed Ne of the engine 22 is compared with a preset threshold rotation speed Nref (step S200). When the rotation speed Ne of the engine 22 is lower than the preset threshold rotation speed Nref (step S200: No), the processing flow returns to step S100. The threshold rotation speed Nref represents a starting rotation speed for a start of fuel injection and ignition of the engine 22 and is set equal to, for example, 1000 rpm or 1200 rpm. When receiving the torque commands Tm1* and Tm2* of the motors MG1 and MG2, the motor ECU 40 drives and controls the motor MG1 to output a torque equivalent to the torque command Tm1*, while driving and controlling the motor MG2 to output a torque equivalent to the torque command Tm2*. The engine-restart, vehicle-start control routine repeats the above series of processing, until elapse of the preset wait time since the start of this routine (step S130). The motor MG2 accordingly outputs only the cancellation torque that cancels out the torque applied to the ring gear shaft 32a or the driveshaft by the torque output of the motor MG1, but does not output a torque equivalent to the torque demand Tr* corresponding to the driver's depression amount of the accelerator pedal 83. The motor MG2 is thus under operation control until elapse of the preset wait time. This involves prohibition of the power output to the ring gear shaft 32a or the driveshaft.

When the preset wait time has elapsed since the start of this engine-restart, vehicle-start control routine, the CPU 72 calculates an upper torque restriction Tmax as a maximum torque output from the motor MG2 according to Equation (2) given below (step S150):

$$Tmax = (Wout - Tm1^* \cdot Nm1)/Nm2 \qquad (2)$$

The upper torque restriction Tmax is given by dividing a difference between the output limit Wout of the battery 50 and power consumption (power generation) of the motor MG1, which is the product of the torque command Tm1* and the current rotation speed Nm1 of the motor MG1, by the current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the transmission 60 according to Equation (3) given below (step S160):

$$Tm2tmp = (Tr^* + Tm1^*/\rho)/Gr \qquad (3)$$

The CPU 72 sets the smaller between the calculated upper torque restriction Tmax and the calculated tentative motor torque Tm2tmp to the torque command Tm2* of the motor MG2 (step S170). The CPU 72 then sends the torque commands Tm1* and Tm2* of the motors MG1 and MG2 to the motor ECU 40 (step S180) and compares the rotation speed Ne of the engine 22 with the preset threshold rotation speed Nref (step S200). When the rotation speed Ne of the engine 22 is lower than the threshold rotation speed Nref (step S200: No), the processing flow returns to step S100. The torque command Tm2* of the motor MG2 set in this manner cancels out the motoring torque for motoring the engine 22 and is output as the torque demand Tr* to the ring gear shaft 32a or the driveshaft under restriction in the output limit of the battery 50. Equation (3) given above is readily introduced from the alignment chart of FIG. 6.

When the rotation speed Ne of the engine 22 reaches or exceeds the preset threshold rotation speed Nref during output of the torque equivalent to the torque demand Tr* to the ring gear shaft 32a with motoring the engine 22, the CPU 72 gives a start command to the engine ECU 24 to start fuel injection and ignition of the engine 22 and sets the start flag Fstart equal to 1 (step S210). The CPU 72 then detects complete or incomplete fuel combustion of the engine 22 (step S220). In the event of incomplete fuel combustion, the processing flow goes back to step S100. Setting the start flag Fstart equal to 1 at step S210 gives a negative answer at step S190. The processing flow accordingly skips the specification of whether the rotation speed Ne of the engine 22 reaches or exceeds the preset threshold rotation speed Nref at step S200 and immediately goes to step S220 for detection of complete or fuel combustion of the engine 22. In response to detection of complete fuel combustion of the engine 22, the processing flow terminates the engine-restart, vehicle-start control routine of FIG. 2 and subsequently starts and repeatedly executes the drive control routine of FIG. 3.

Like step S100 in the engine-restart, vehicle-start control routine of FIG. 2, the CPU 72 of the hybrid electronic control unit 70 first inputs various data required for control, that is, the accelerator opening Acc from the accelerator pedal position sensor 84, the vehicle speed V from the vehicle speed sensor 88, the rotation speeds Nm1 and Nm2 of the motors MG1 and MG2, the rotation speed Ne of the engine 22, and the input limit Win and the output limit Wout of the battery 50 at step S300 in the drive control routine of FIG. 3. The CPU 72 subsequently refers to the torque demand setting map of FIG. 4 to set the torque demand Tr*, which is to be output to the ring gear shaft 32a or the driveshaft, and sets a vehicle power demand P* required for the hybrid vehicle 20, based on the input accelerator opening Acc and the input vehicle speed V (step S310). The vehicle power demand P* is calculated as the sum of the product of the torque demand Tr* and a rotation speed Nr of the ring gear shaft 32a or the driveshaft, a charge-discharge power demand Pb* to be charged into or discharged from the battery 50, and a potential loss. The rotation speed Nr of the ring gear shaft 32a is obtained by multiplying the vehicle speed V by a preset conversion factor k.

The vehicle power demand P* is compared with a previous engine power demand Pe* (previous Pe*), which has been set in a previous cycle of this drive control routine as a power required for the engine 22 (step S320). When the previous engine power demand Pe* is less than the vehicle power demand P* (step S320: Yes), the CPU 72 adds a preset rate value Prt to the previous engine power demand Pe* and sets the smaller between the result of the addition and the vehicle power demand P* to a new engine power demand Pe* (step S330). When the previous engine power demand Pe* is not less than the vehicle power demand P* (step S320: No), on the other hand, the CPU 72 subtracts the preset rate value Prt from the previous engine power demand Pe* and sets the greater between the result of the subtraction and the vehicle power demand P* to a new engine power demand Pe* (step S340). The rate value Prt is set equal to or slightly lower than an upper limit for a smooth change of the power output from the engine 22 during the interval of the repeated execution of this drive control routine. Updating the engine power demand Pe* in this manner ensures a smooth change of the power output from the engine 22. The current state in the processing flow is immediately after the restart and complete fuel combustion of the engine 22 in response to the driver's heavy depression of the accelerator pedal 83. The vehicle power demand P* is greater than the previous engine power demand Pe* (initial value=0). At this moment, the sum of the previous engine power demand Pe* and the preset rate value Prt is set to the new engine power demand Pe*. During the repeated execution of the drive control routine, the engine power demand Pe* is sequentially updated to gradually approach the vehicle power demand P*.

Figure 7:
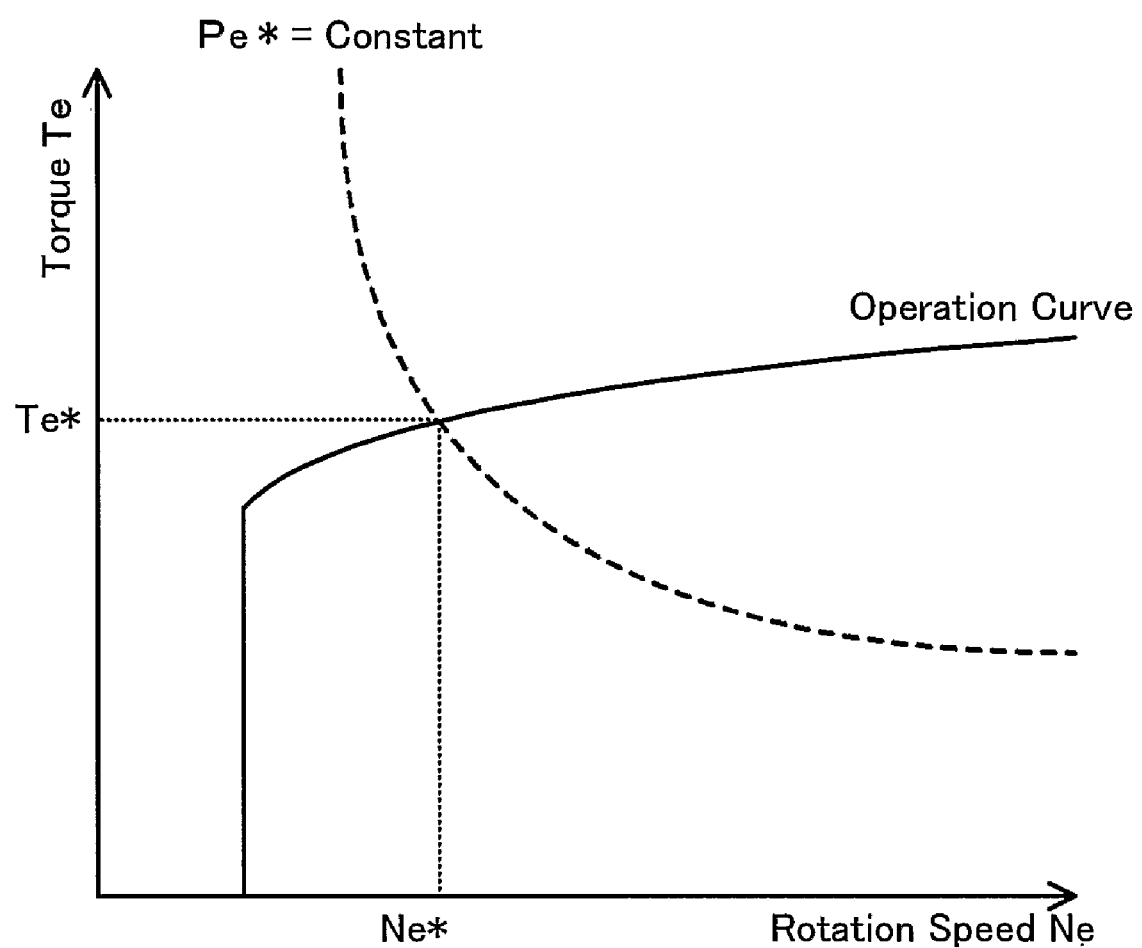
FIG. 7 shows an efficient operation curve of the engine to set a target rotation speed Ne* and a target torque Te*.

After updating the engine power demand Pe*, the CPU 72 sets a target rotation speed Ne* and a target torque Te* of the engine 22 corresponding to the new engine power demand Pe* (step S350). The target rotation speed Ne* and the target torque Te* of the engine 22 are determined according to an efficient operation curve of ensuring efficient operations of the engine 22 and a curve of the engine power demand Pe*. FIG. 7 shows an efficient operation curve of the engine 22 to set the target rotation speed Ne* and the target torque Te*. As clearly shown in FIG. 7, the target rotation speed Ne* and the target torque Te* are given as an intersection of the efficient operation curve and a curve of constant engine power demand Pe* (=Ne*×Te*).

After setting the target rotation speed Ne* and the target torque Te* of the engine 22, the CPU 72 calculates a target rotation speed Nm1* of the motor MG1 from the target rotation speed Ne* of the engine 22, the rotation speed Nr (=Nm2/Gr) of the ring gear shaft 32a, and the gear ratio ρ of the power distribution integration mechanism 30 according to Equation (4) given below, while calculating the torque command Tm1* of the motor MG1 from the calculated target rotation speed Nm1* and the current rotation speed Nm1 of the motor MG1 according to Equation (5) given below (step S360):

$$Nm1^* = Ne^* \cdot (1+\rho)/\rho - Nm2/(Gr \cdot \rho) \quad (4)$$

$$Tm1^* = \text{Previous } Tm1^* + k1(Nm1^* - Nm1) + k2\int(Nm1^* - Nm1)dt \quad (5)$$

Figure 8:
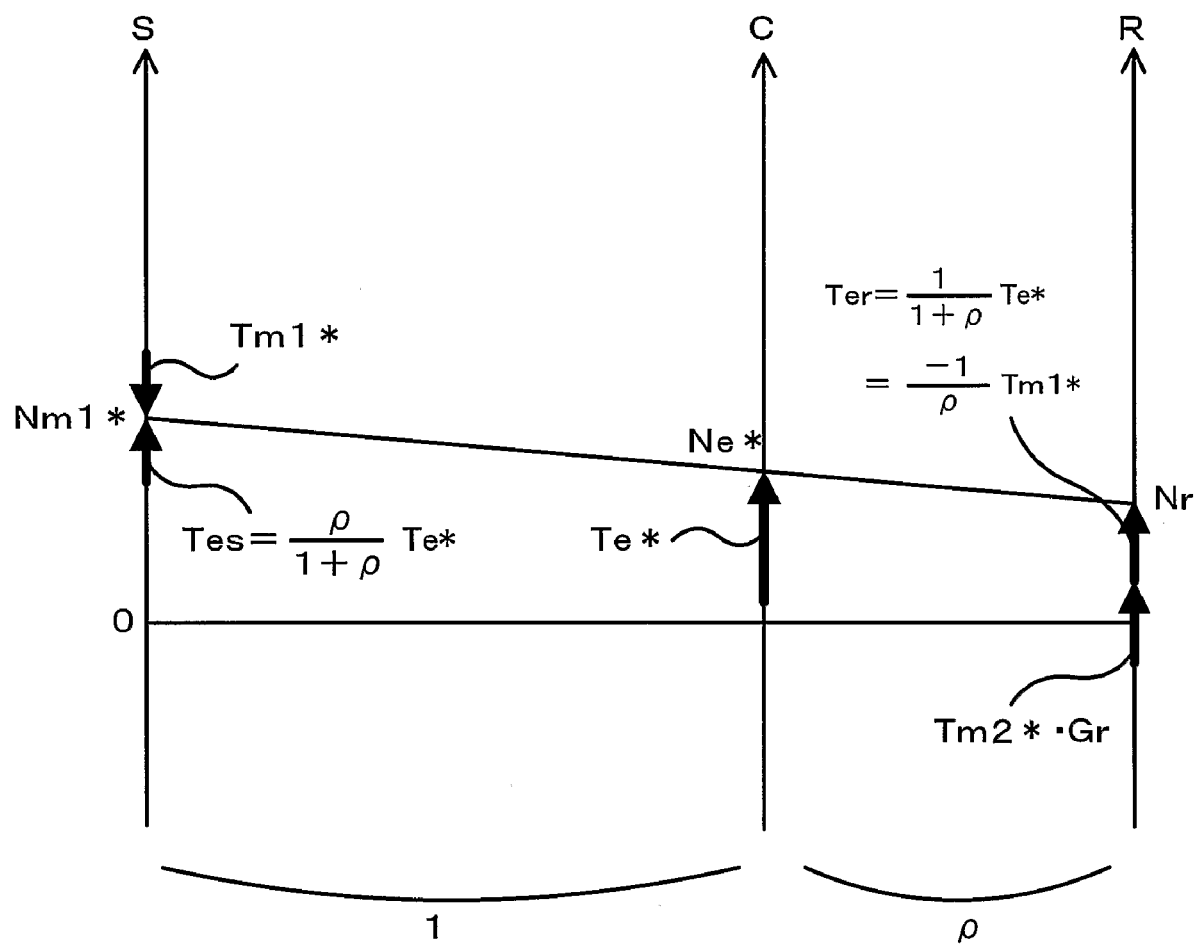
FIG. 8 is an alignment chart showing torque-rotation speed dynamics of the respective rotational elements of the power distribution integration mechanism.

Equation (4) is a dynamic relational expression of the rotational elements included in the power distribution integration mechanism 30. FIG. 8 is an alignment chart showing torque-rotation speed dynamics of the respective rotational elements included in the power distribution integration mechanism 30. Two upward thick arrows on the axis 'R' respectively show a torque that is transmitted to the ring gear shaft 32a when the torque Te* is output from the engine 22 that is in steady operation at a specific drive point of the target rotation speed Ne* and the target torque Te*, and a torque that is applied to the ring gear shaft 32a via the reduction gear 35 when a torque Tm2* is output from the motor MG2. Equation (4) is readily introduced from the alignment chart of FIG. 8 Equation (5) is a relational expression of feedback control to drive and rotate the motor MG1 at the target rotation speed Nm1*. In Equation (5) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and the upper torque restriction Tmax as minimum and maximum torques output from the motor MG2 according to Equations (6) and (7) given below (step S370):

$$Tmin = (Win - Tm1^* \cdot Nm1)/Nm2 \quad (6)$$

$$Tmax = (Wout - Tm1^* \cdot Nm1)/Nm2 \quad (7)$$

The lower torque restriction Tmin and the upper torque restriction Tmax are respectively given by dividing a difference between the input limit Win of the battery 50 and power consumption (power generation) of the motor MG1, which is the product of the torque command Tm1* and the current rotation speed Nm1 of the motor MG1, and a difference between the output limit Wout of the battery 50 and the power consumption (power generation) of the motor MG1 by the current rotation speed Nm2 of the motor MG2. The CPU 72 then calculates the tentative motor torque Tm2tmp to be output from the motor MG2 from the torque demand Tr*, the torque command Tm1* of the motor MG1, the gear ratio ρ of the power distribution integration mechanism 30, and the gear ratio Gr of the transmission 60 according to Equation (8) given below (step S380):

$$Tm2tmp = (Tr^* + Tm1^*/\rho)/Gr \quad (8)$$

The CPU 72 limits the tentative motor torque Tm2tmp to the range between the calculated lower torque restriction Tmin and upper torque restriction Tmax to set the torque command Tm2* of the motor MG2 (step S390). Setting the torque command Tm2* of the motor MG2 in this manner restricts the torque demand Tr* to be output to the ring gear shaft 32a or the driveshaft within the range between the input limit Win and the output limit Wout of the battery 50. Equation (8) is readily introduced from the alignment chart of FIG. 8.

After setting the target, rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S400) and exits from this drive control routine. The engine ECU 24 receives the target rotation speed Ne* and the target torque Te* and performs fuel injection control and ignition control of the engine 22 to drive the engine 22 at a specified drive point of the target rotation speed Ne* and the target torque Te*. The motor ECU 40 receives the torque commands Tm1* and Tm2* and performs switching control of the switching elements included in the respective inverters 41 and 42 to drive the motor MG1 with the torque command Tm1* and the motor MG2 with the torque command Tm2*.

Figure 9:
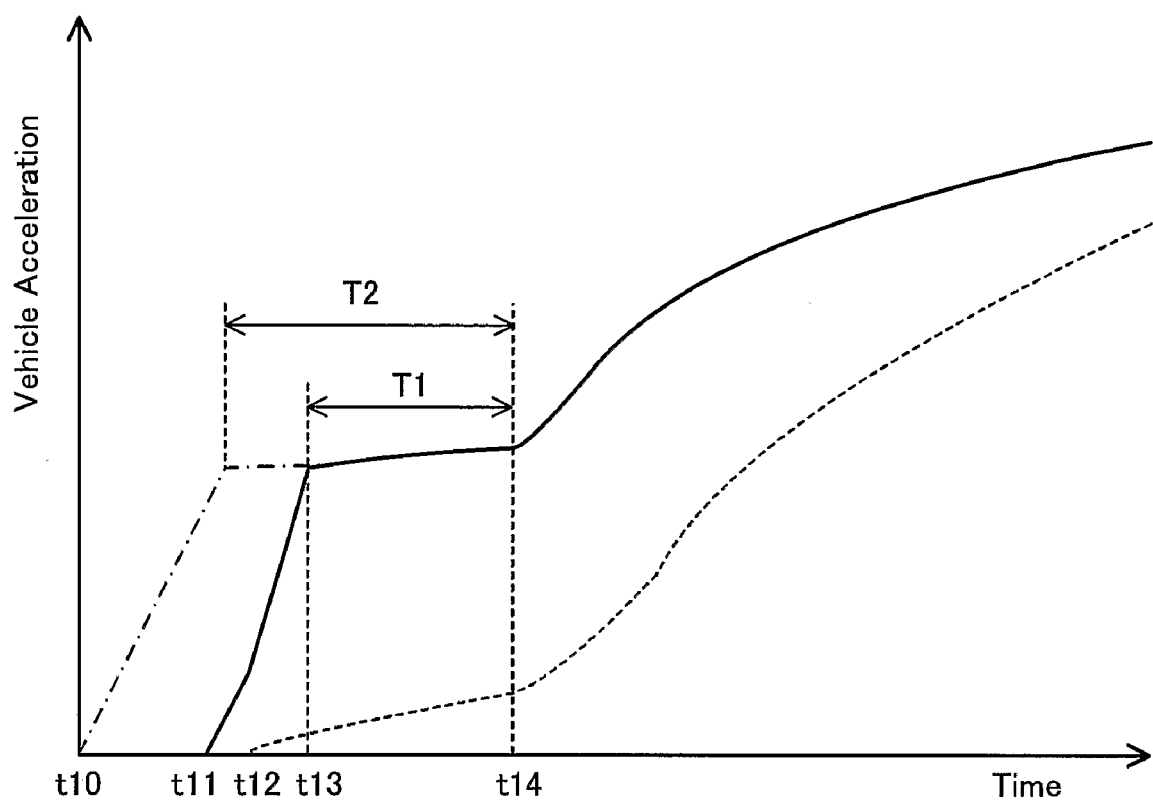
FIG. 9 shows comparison between time variations of vehicle acceleration in the embodiment and in a comparative example.

FIG. 9 shows comparison between time variations of vehicle acceleration in the embodiment and in a comparative example when the hybrid vehicle 20 starts in response to the driver's heavy depression of the accelerator pedal 83 during a stop with the operation stop of the engine 22. A solid line curve represents a time variation of vehicle acceleration in the embodiment, and a one-dot chain line curve represents a time variation of vehicle acceleration in the comparative example. A broken line curve represents contribution of the power output from the engine 22 to the vehicle acceleration. The comparative example controls the motor MG2 to output the torque demand Tr* corresponding to the accelerator opening Acc immediately after the driver's heavy depression of the accelerator pedal 83 without waiting until elapse of the preset wait time. In the comparative example, the motor MG2 starts outputting the torque demand Tr* corresponding to the accelerator opening Acc at a time t10 when the driver steps on the accelerator pedal 83. The immediate torque output from the motor MG2 immediately generates the vehicle acceleration. The insufficient power output restricts the increase in vehicle acceleration for a time period T2 until a time t14 when the contribution of the power output from the engine 22 abruptly increases. This relatively long time period T2 before the abrupt increase in contribution of the power output from the engine 22 undesirably causes the driver to feel the unexpectedly slow acceleration. In the embodiment, on the other hand, the motor MG2 starts outputting the torque demand Tr* corresponding to the accelerator opening Acc at a time t11 after elapse of a preset wait time (for example, 0.3 seconds) since the driver's depression of the accelerator pedal 83. The insufficient power output restricts the increase in vehicle acceleration for a time period T1 until the time t14 when the contribution of the power output from the engine 22 abruptly increases. The time period T1 is shorter than the time period T2. The control of the embodiment thus prevents the driver from feeling the unexpectedly slow acceleration. As mentioned previously, the preset wait time elapsing the driver's depression of the accelerator pedal 83 and an actual output of the torque demand Tr* from the motor MG2 is determined not to make the driver feel uncomfortable with a poor response. The wait time until generation of the vehicle acceleration accordingly does not make the driver feel strange.

As described above, in response to the driver's heavy depression of the accelerator pedal 83 during a vehicle stop with the operation stop of the engine 22, the hybrid vehicle 20 of the embodiment waits until elapse of the preset wait time, which is determined not to make the driver feel uncomfortable with a poor response, and then starts output of the torque demand Tr* to the ring gear shaft 32a or the driveshaft. Such control desirably prevents the driver from feeling the unexpectedly slow acceleration, which is caused by the restricted vehicle acceleration until a start of the engine 22 to output sufficient power and make significant contribution to the vehicle acceleration. This arrangement ensures smooth torque output on a restart of the engine 22 and improves the driver's drive feeling.

The hybrid vehicle 20 of the embodiment controls the motor MG2 not to start outputting torque to the ring gear shaft 32a or the driveshaft until elapse of the preset wait time since the driver's depression of the accelerator pedal 83. One possible modification may control the motor MG2 to output a limited level of torque to the ring gear shaft 32a or the driveshaft until elapse of the preset wait time since the driver's depression of the accelerator pedal 83.

In the hybrid vehicle 20 of the embodiment, the wait time elapsing the driver's depression of the accelerator pedal 83 and an actual output of the torque demand Tr* from the motor MG2 is determined not to make the driver feel uncomfortable with a poor response. The wait time is set equal to 0.2 to 0.3 seconds in the embodiment. The wait time may be set to a shorter time such as 0.1 second or to a longer time such as 0.4 to 0.5 seconds. Setting the longer time to the wait time may cause the driver to feel slightly uncomfortable with a poor response.

Figure 10:
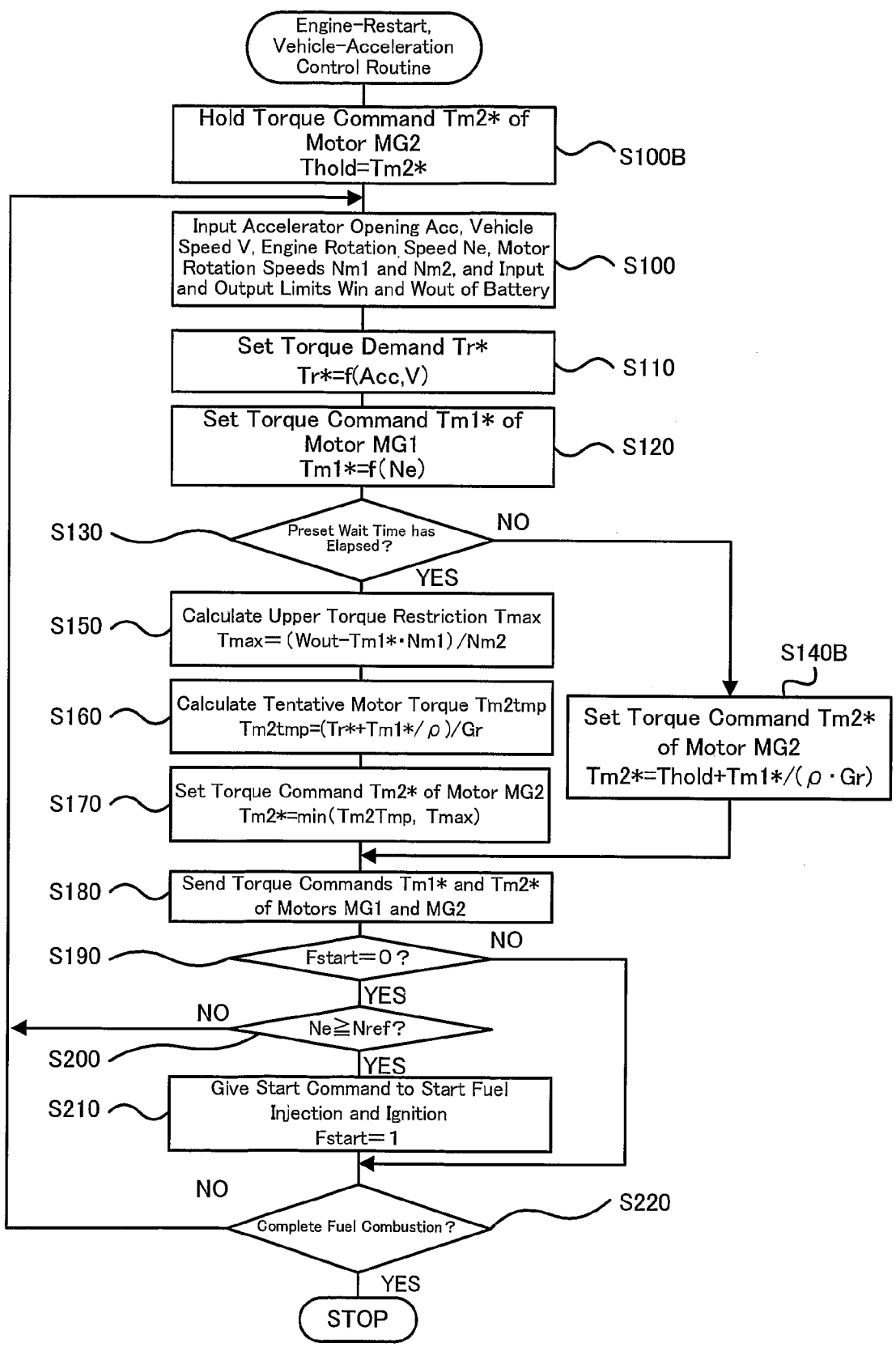
FIG. 10 is a flowchart showing an engine-restart, vehicle-acceleration control routine.

The embodiment regards the engine-restart, vehicle-start control to restart the engine 22 and start the hybrid vehicle 20 in response to the driver's heavy depression of the accelerator pedal 83 during a vehicle stop with an auto stop of the engine 22. This control technique is also applicable to accelerate the hybrid vehicle 20 in response to the driver's heavy depression of the accelerator pedal 83 in the motor drive mode with an auto stop of the engine 22. In the motor drive mode, the hybrid vehicle 20 is driven with the output power of the motor MG2. In this application, an engine-restart, vehicle-acceleration control routine shown in the flowchart of FIG. 10 is executed, instead of the engine-restart, vehicle-start control routine of FIG. 2. In the engine-restart, vehicle-acceleration control routine of FIG. 10, the CPU 72 of the hybrid electronic control unit 70 first holds the torque command Tm2* of the motor MG2 as a holding torque Thold (step S100B) and executes the processing of steps S100 through S120 in the same manner as the engine-restart, vehicle-start control routine of FIG. 2. Until elapse of a preset wait time, which is determined not to make the driver feel uncomfortable with a poor response, the torque command Tm2* of the motor MG2 is set to the sum of the holding torque Thold and the cancellation torque (step S140B). Here the cancellation torque cancels out the output torque of the motor MG2 for motoring the engine 22 (torque calculated by the right side of Equation (1) given previously). This torque command Tm2* of the motor MG2 is sent with the torque command Tm1* of the motor MG1 to the motor ECU 40 (step S180). This modified control procedure holds the output torque to the ring gear shaft 32a or the driveshaft until elapse of the preset wait time, which is determined not to make the driver feel uncomfortable with a poor response. After the elapse of the preset wait time, the processing of and after step S150 is executed in the same manner as the engine-restart, vehicle-start control routine of FIG. 2. In response to detection of complete fuel combustion of the engine 22, the processing flow terminates this engine-restart, vehicle-acceleration control routine of FIG. 10 and repeatedly executes the drive control routine of FIG. 3. This application outputs the torque demand Tr* to the ring gear shaft 32a or the driveshaft for acceleration of the hybrid vehicle 20 in the motor drive mode, after elapse of the preset wait time that is determined not to make the driver feel uncomfortable with a poor response. Such control desirably prevents the driver from feeling the unexpectedly slow acceleration, which is caused by the restricted vehicle acceleration until a start of the engine 22 to output sufficient power and make significant contribution to the vehicle acceleration. This arrangement ensures smooth torque output for acceleration of the hybrid vehicle 20, which is driven with the output power of the motor MG2 in the motor drive mode with an auto stop of the engine 22, and improves the driver's drive feeling.

In this application, the hybrid vehicle 20 executes the engine-restart, vehicle-acceleration control routine of FIG. 10 in response to an acceleration request. The engine-restart, vehicle-acceleration control of this application holds the torque level output from the motor MG2 to the ring gear shaft 32a until elapse of the preset wait time, which is determined not to make the driver feel uncomfortable with a poor response. The control of holding the output torque level is, however, not essential, and the requirement is restricted power output. One possible modification may set the torque command Tm2* of the motor MG2 to gradually increase the output torque to the ring gear shaft 32a, instead of holding the output torque level.

Figure 11:
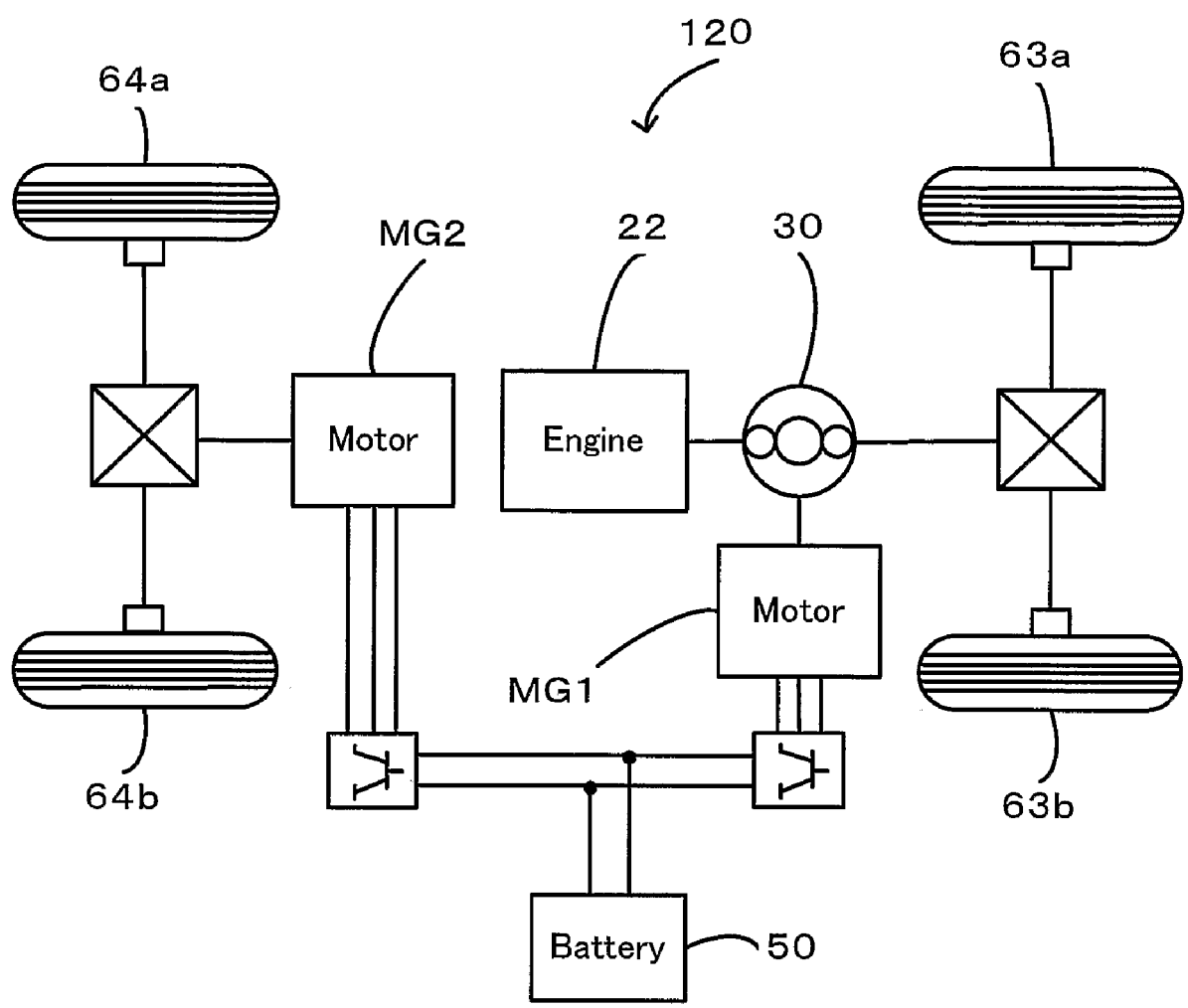
FIG. 11 schematically shows the structure of another hybrid vehicle in one modified example.

In the hybrid vehicle 20 of the embodiment described above, the power of the motor MG2 goes through the change speed by the reduction gear 35 and is output to the ring gear shaft 32a or the driveshaft. The technique of the invention is, however, not restricted to this configuration but may be adopted in a hybrid vehicle 120 of a modified configuration shown in FIG. 11, where the power of the motor MG2 is transmitted to a different axle (an axle linked to wheels 64a and 64b) from the axle connecting with the ring gear shaft 32a (the axle linked to the drive wheels 63a and 63b).

Figure 12:
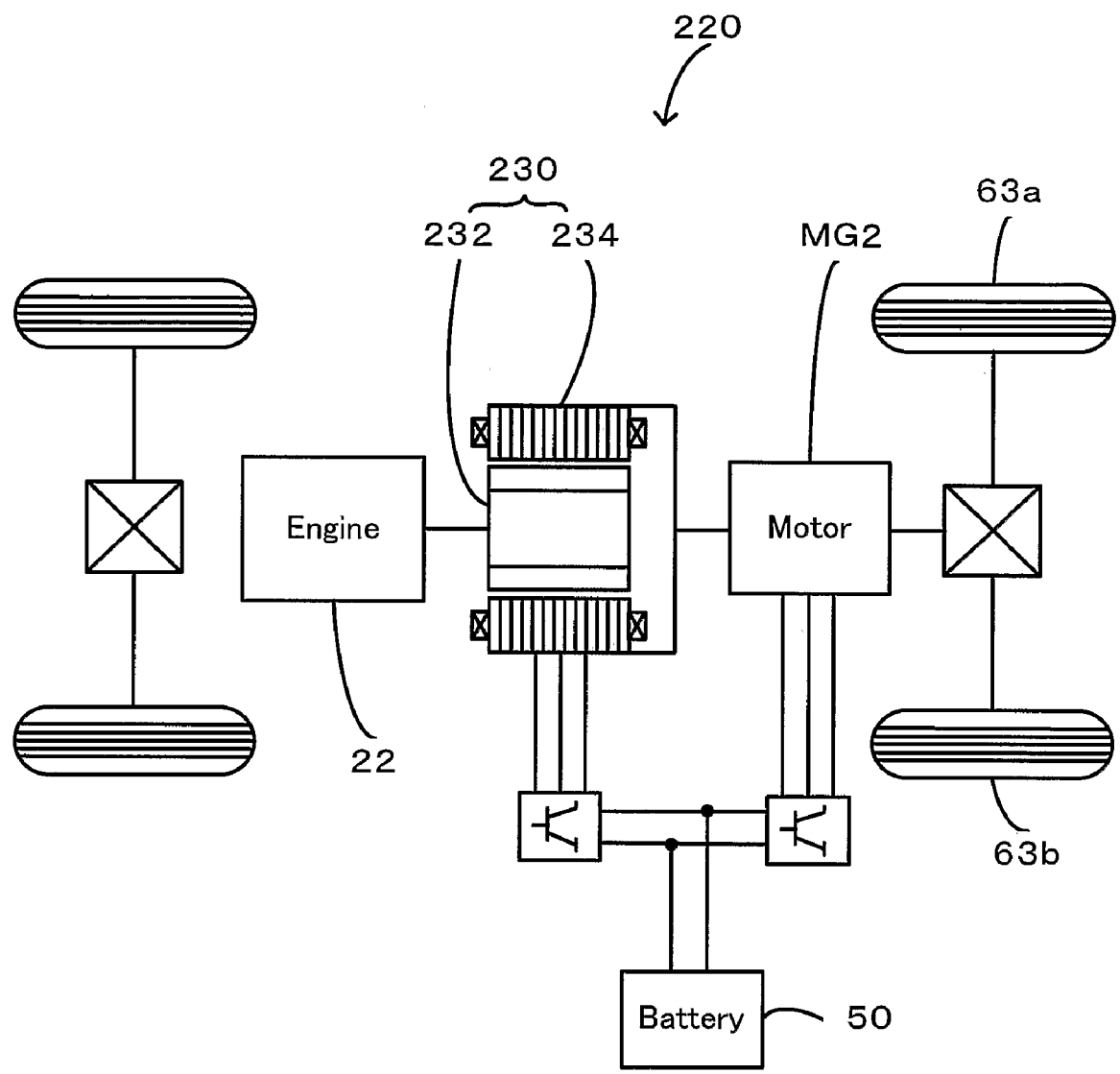
FIG. 12 schematically shows the structure of still another hybrid vehicle in another modified example.

In the hybrid vehicle 20 of the embodiment, the power of the engine 22 is output via the power distribution integration mechanism 30 to the ring gear shaft 32a or the driveshaft connected to the drive wheels 63a and 63b. The technique of the invention is, however, not restricted to this configuration but may also be applicable to a hybrid vehicle 220 of another modified configuration shown in FIG. 12. The hybrid vehicle 220 of FIG. 12 has a pair-rotor motor 230 including an inner rotor 232 connected to the crankshaft 26 of the engine 22 and an outer rotor 234 connected to a driveshaft for output of the power to the drive wheels 63a and 63b. The pair-rotor motor 230 transmits part of the output power of the engine 22 to the driveshaft, while converting the residual engine output power into electric power.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably applied to automobile manufacturing industries and other relevant industries.

The invention claimed is:
1. A hybrid vehicle with an internal combustion engine capable of outputting driving power and at least one motor capable of outputting driving power, said hybrid vehicle comprising:

an auto stop restart module that automatically stops said internal combustion engine upon satisfaction of a preset engine stop condition and automatically restarts said internal combustion engine upon satisfaction of a preset engine start condition;

a driving force demand setting module that sets a driving force demand required for driving said hybrid vehicle; and a control module that controls said internal combustion engine and said motor so as to ensure output of a driving force based on said driving power demand set by said driving force demand setting module while imposing restriction on operation of said motor in response to setting of a driving force demand for vehicle start or acceleration by said driving force demand setting module upon satisfaction of said preset engine start condition during an auto stop of said internal combustion engine, said control module removing said restriction on said operation of said motor upon satisfaction of a predetermined restriction cancellation condition which is elapse of a preset wait time since setting of said driving force demand for vehicle start or acceleration.

2. A hybrid vehicle in accordance with claim 1, wherein said restriction imposed on said operation of said motor prohibits power output from said motor.

3. A hybrid vehicle in accordance with claim 1, wherein said restriction imposed on said operation of said motor holds a level of power output from said motor.

4. A hybrid vehicle in accordance with claim 1, wherein said preset wait time is a time period is 0.1 to 0.5 seconds.

5. A hybrid vehicle in accordance with claim 1, wherein said preset engine start condition includes a condition that said driving force demand set by said driving force demand setting module is not less than a predetermined level.

6. A hybrid vehicle in accordance with claim 1, said hybrid vehicle further comprising:

an electric power-mechanical power input output mechanism connected with an output shaft of said internal combustion engine and an axle, said mechanism outputting at least part of the power of said internal combustion engine to said axle through input and output of electric power and mechanical power.

7. A hybrid vehicle in accordance with claim 6, wherein said electric power-mechanical power input output mechanism includes a three shaft-type power input output unit linked to three shafts, said output shaft of said internal combustion engine, said axle, and a rotating shaft, said unit automatically inputting and outputting power from and to a residual one shaft based on powers input from and output to any two shafts among said three shafts; and a generator that inputs and outputs power from and to said rotating shaft.

8. A hybrid vehicle in accordance with claim 6, wherein said electric power-mechanical power input output mechanism includes a pair-rotor motor that has a first rotor connected to said output shaft of said internal combustion engine and a second rotor connected to said axle, said mechanism being driven to rotate through relative rotation of said first rotor to said second rotor.

9. A hybrid vehicle in accordance with claim 1, wherein said motor inputs and outputs power from and to an axle that receives output of power from said internal combustion engine.

10. A hybrid vehicle in accordance with claim 1, wherein said motor inputs and outputs power from and to another axle different from an axle that receives output of power from said internal combustion engine.

11. A hybrid vehicle in accordance with claim 1, wherein said motor is either one or both of a first motor inputting and outputting power from and to one axle that receives output of power from said internal combustion engine and a second motor inputting and outputting power from and to another axle different from said one axle.

12. A control method of a hybrid vehicle, said hybrid vehicle being equipped with an internal combustion engine capable of outputting driving power and at least one motor capable of outputting driving power, said hybrid vehicle automatically stopping said internal combustion engine upon satisfaction of a preset engine stop condition and automatically restarting said internal combustion engine upon satisfaction of a preset engine start condition, said method comprising the steps of:

controlling said internal combustion engine and said motor so as to ensure output of a driving force based on said driving power demand set by said driving force demand setting module while imposing restriction on operation of said motor in response to setting of a driving force demand for vehicle start or acceleration by said driving force demand setting module upon satisfaction of said preset engine start condition during an auto stop of said internal combustion engine; and removing said restriction on said operation of said motor upon satisfaction of a predetermined restriction cancellation condition which is elapse of a preset wait time since setting of said driving force demand for vehicle start or acceleration.

* * * * *

UNITED STATES PATENT AND TRADEMARK OFFICE
CERTIFICATE OF CORRECTION

PATENT NO. : 7,677,341 B2
APPLICATION NO. : 11/883326
DATED : March 16, 2010
INVENTOR(S) : Kentaro Tomo It is certified that error appears in the above-identified patent and that said Letters Patent is hereby corrected as shown below:

Title Page, Item (86) PCT No.:

Please delete the following:

"(86)    PCT No.:    PCT/JP2006/011355"

and Replace with:

(86)    PCT No.:    PCT/JP2006/311355

Signed and Sealed this

Eighteenth Day of May, 2010

David J. Kappos
*Director of the United States Patent and Trademark Office*